(12) United States Patent
Liu et al.

(10) Patent No.: US 6,234,780 B1
(45) Date of Patent: May 22, 2001

(54) VACUUM OSMOSIS AND SOLIDIFICATION FORMING MACHINE

(75) Inventors: Mung-Chang Liu, Hsi Chih; Min-Yen Huang, Tainan, both of (TW)

(73) Assignee: J.A.T. Engineering Co., Ltd. (TW)

( * ) Notice: Subject to any disclaimer, the term of this patent is extended or adjusted under 35 U.S.C. 154(b) by 0 days.

(21) Appl. No.: 09/389,014

(22) Filed: Sep. 2, 1999

(51) Int. Cl.[7] .................................................. B29C 43/04
(52) U.S. Cl. ...................... 425/256; 452/352; 452/405.1
(58) Field of Search ............................. 425/405.1, 352, 425/354, 257, 258, 256, 403.1

(56) References Cited

U.S. PATENT DOCUMENTS

| | | | |
|---|---|---|---|
| 2,404,559 | * 7/1946 | Asbaugh | 425/354 |
| 4,153,404 | * 5/1979 | Ottman | 425/352 |
| 4,534,721 | * 8/1985 | Iwasaki et al. | 425/352 |
| 5,176,777 | * 1/1993 | Guilhem | 425/405.1 |

* cited by examiner

*Primary Examiner*—Harold Pyon
*Assistant Examiner*—Thu Khanh T. Nguyen
(74) *Attorney, Agent, or Firm*—Dougherty & Troxell

(57) ABSTRACT

A vacuum osmosis and solidification forming machine mainly comprises a forming chamber, a compressible hydraulic cylinder, a closed hydraulic cylinder, and a support frame. A solidifying material A and a pending solidification material B pre-dried and mixed uniformly in predetermined dose ratio are guided into the air evacuated empty forming chamber to meet with a foggy liquid stabilizer or assistant. So that, the materials A, B are contacted sufficiently with the stabilizer for being thoroughly moistened by the capillary phenomenon and compressed to a minimum volume for being solidified.

2 Claims, 6 Drawing Sheets

VACUUM OSMOSIS AND SOLIDIFICATION FORMING MACHINE

BACKGROUND OF THE INVENTION

1. As ball clay, pottery clay, or china clay, etc cannot coagulate itself to form articles as hard as those made through firing, hence, sintering process of the green-cast article and some related machinery, such as screw mixer, kneading mill, and forming machine, etc, have been used for quite a long time. However, at the time the concept of environment protection is greatly enhanced, the sintering process is supposed to lead itself approaching a dead end owing to its released toxic gases.

2. A sintering free hydration process may take its place to cake and harden cement, lime, and the like, which will commence coagulation within 40 minutes after meeting moisture (without sintering), and become harder and harder with time. And, it is understood that coagulating and hardening principle is quite different between sintering and hydrating, the implements used in the former is no longer applicable to the latter.

If the machines applied in point 1 are employed for producing the materials in point 2, it is possible that some remainder will stay at corners in blind angle after a working cycle to interfere the new coming material. And, from time to time, the remainder becomes bigger and bigger, harder and harder by accumulation to finally clog operation of the implements.

In view of the above, this invention discards the conventional process that mixes dry and wet materials together, also the auger extrusion forming machine and blade mixing method. Instead, this invention separates the dry and the wet material for uniformly pre-mixing respectively to change the fabrication process and implementation thoroughly in order to realize a smooth mass production with higher quality for materials that can become coagulated and hardened by moisture.

SUMMARY OF THE INVENTION

This invention relates a vacuum osmosis and solidification forming machine, particularly to a forming machine that evacuates air from a forming chamber with a vacuum pump to enable the pre-dosed uniform dry powder of a solidifying or a pending solidification material put in the forming chamber thereafter to avail itself of the principle of liquid extraction by vacuum osmosis to contact entirely with a dosed liquid stabilizer sprayed into the chamber, and to be compressed to a minimum volume for achieving solidifying condition of saturated moisture.

BRIEF DESCRIPTION OF THE DRAWINGS

For a better understanding to the present invention, together with further advantages or features thereof, at least one preferred embodiment will be elucidated below with reference to the annexed drawings in which.

DETAILED DESCRIPTION OF THE PREFERRED EMBODIMENT

This invention is proposed to provide a vacuum osmosis and solidification forming machine that can moisten a dry or a wet material to saturated condition by vacuum principle without using blade agitation to permit entire contact of a powder material with a liquid material for prolonging lifetime of implements and realizing a purpose of smooth mass production.

Figure 1:
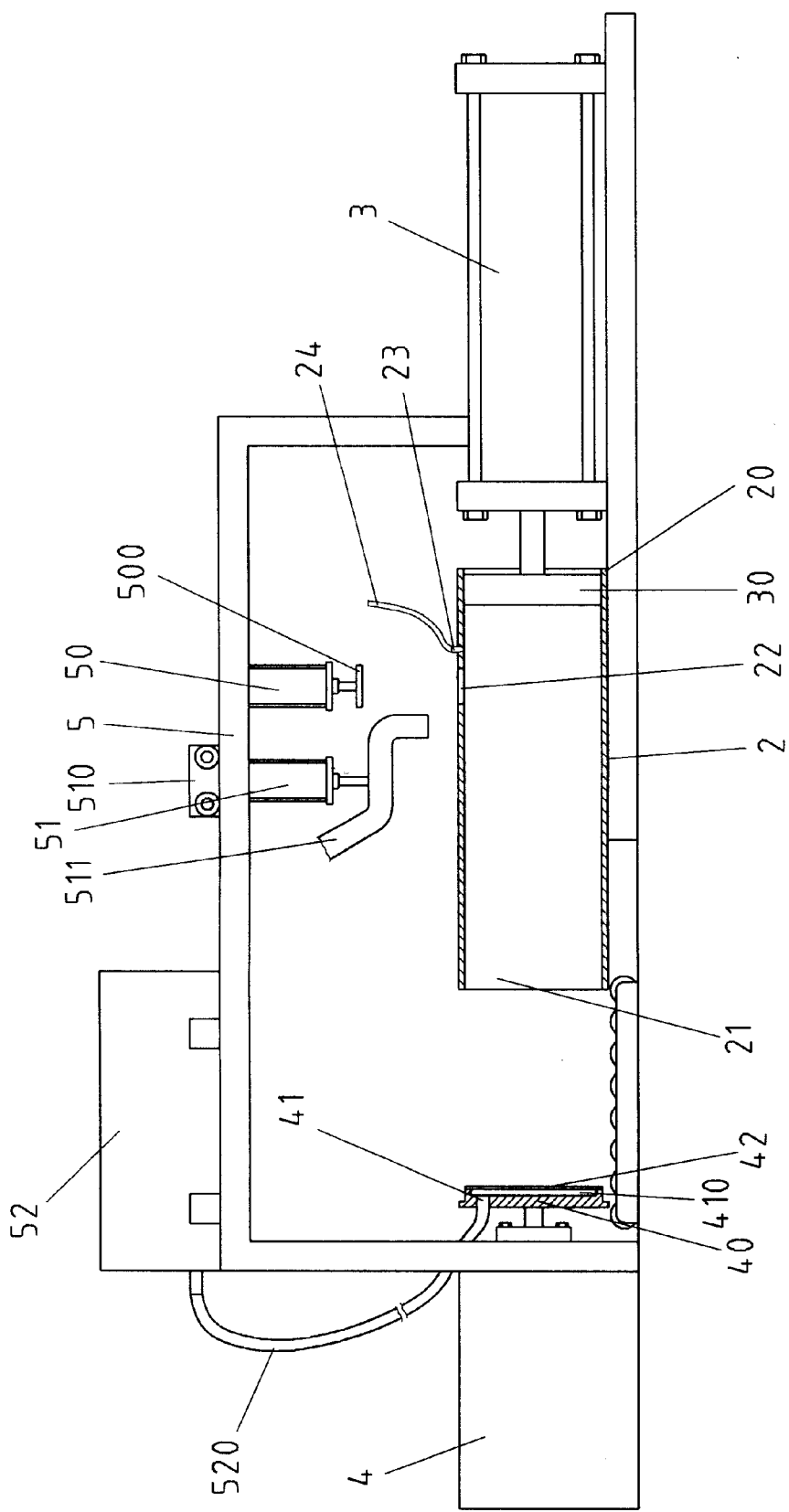
FIG. 1 is a schematic assembled view of this invention.

Firstly, as shown in FIG. 1, this invention mainly comprises a forming chamber 2, a compressible hydraulic cylinder 3, a closed hydraulic cylinder 4, and a support frame 5.

The forming chamber 2 is an empty space, wherein an inlet 20 and an outlet 21 are defined in opposite chamber walls; a feeding mouth 22 is formed in ceiling of the chamber 2, and a spray nozzle 23 located adjacently to the feeding mouth 22 is coupled with an injection tube 24.

The compressible hydraulic cylinder 3 is placed in front of the inlet 20, wherein a piston 30 is provided to the compressible hydraulic cylinder 3 at its front end; and the piston 30 is closely attached to inner side of the inlet 20 of the forming chamber 2.

The closed hydraulic cylinder 4 is disposed near the outlet 21 of the forming chamber 2, wherein a sealing cover 40 is provided to the closed hydraulic cylinder 4 at its front end; the sealing cover 40 is perforated to form an air evacuation orifice 41; an communicable gas room 410 is located in front of the sealing cover 40 by a proper distance and is equipped with a filter net 42 on its face; the filter net 42 is made of a metallic material and is covered with a replaceable non-wooven cloth piece for protecting the metallic filter net 42.

The support frame 5 is arranged above the forming chamber 2, wherein a stationary hydraulic cylinder 50 is installed at the support frame 5, and a sealing board 500 is provided to the stationary hydraulic cylinder 50 at its front end; a movable hydraulic cylinder 51 is positioned laterally near the stationary hydraulic cylinder 50 and is offered with a pulley set 510 facilitating the hydraulic cylinder 51 to move horizontally on the support frame 5; an input tube 511 is jointedly disposed at the front end of the movable hydraulic cylinder 51; a vacuum pump 52 is installed at a lateral end of the support frame 5; and a vacuum tube 520 is coupled with the air evacuation orifice 41 of the sealing cover 40.

Figure 2:
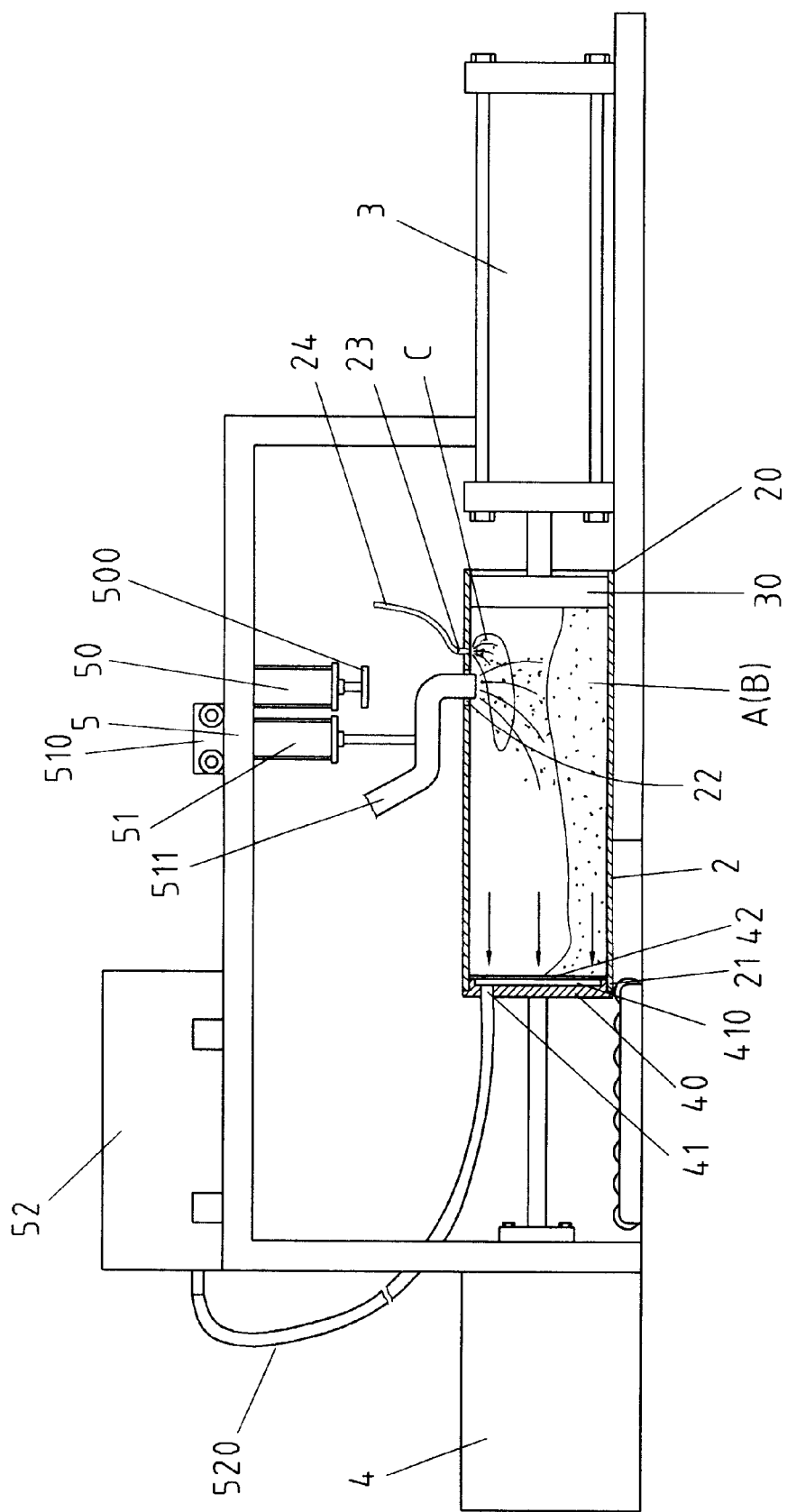
FIG. 2 is a schematic view of this invention showing injection of a solid or solidified material.
Figure 3:
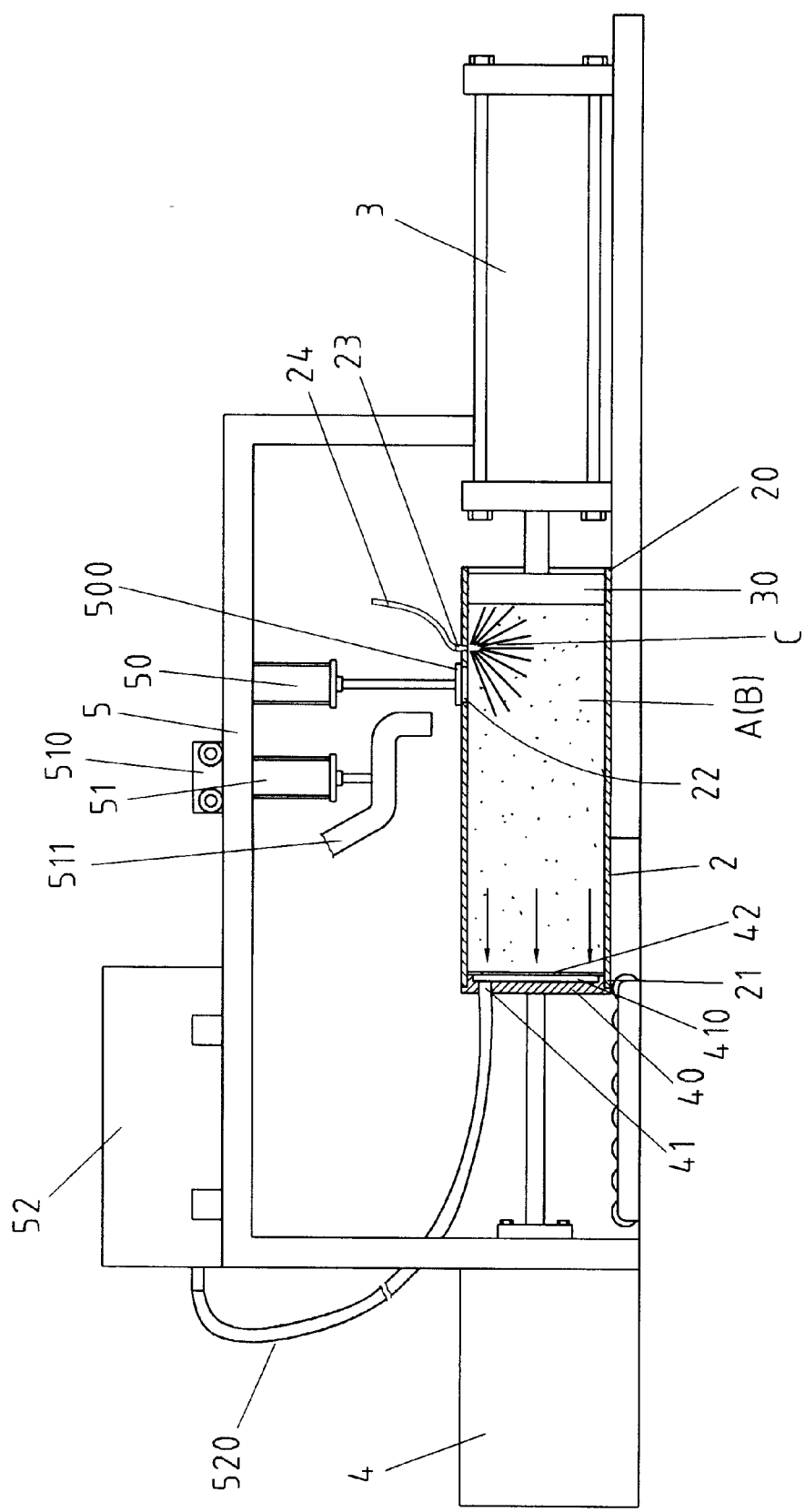
FIG. 3 is a schematic view of this invention showing injection of a stabilizer.

When operating, as shown in FIG. 2, the closed hydraulic cylinder 4 starts to push the sealing cover 40 to seal the outlet 21 of the forming chamber 2, and the pulley set 510 moves on the support frame 5 horizontally to drive the movable hydraulic cylinder 51 to an optimum position to enable the input tube 511 to enter the feeding mouth 22. In virtue of a negative pressure created during air evacuation, the input tube 511 is capable of sucking a pre-dried and uniformly mixed solidifying material A (such as cement, lime, pyrophyllite, ash, gypsum, magnesium oxide, etc) and a pending solidification material B (such as sand, mud, dry powder, powdery industrial waste, etc) with 3% moisture content approximate in order not to fly around during feeding process. In the duration the vacuum pump is working, the operator is to inject a foggy liquid stabilizer C (liquid ions or other industrial assistants) through the spray nozzle 23 of the injection tube 24 until a pre-determined quantity is reached, then remove the input tube 511. At this time, the stationary hydraulic cylinder 50 is supposed to move downwards until the sealing board 500 covers the feeding mouth 22 to thoroughly close the forming chamber 2. Nevertheless, the vacuum pump 52 is still evacuating air from the forming chamber 2 via the evacuation orifice 41 to enter the vacuum tube 520 while the solidifying material A and the material pending solidification B are stopped by the filter net 42 to remain in the forming chamber 2.

The liquid stabilizer C will produce a negative pressure due to vacuum osmosis, that is, the side with larger pressure osmoses into the side with smaller pressure, hence, it can propagate to everywhere in gap of dry material molecules in the forming chamber 2 and moisten the solidifying material A and the pending solidification material B to obtain an efficacy of sufficient real contact under pseudo-mixture.

Figure 4:
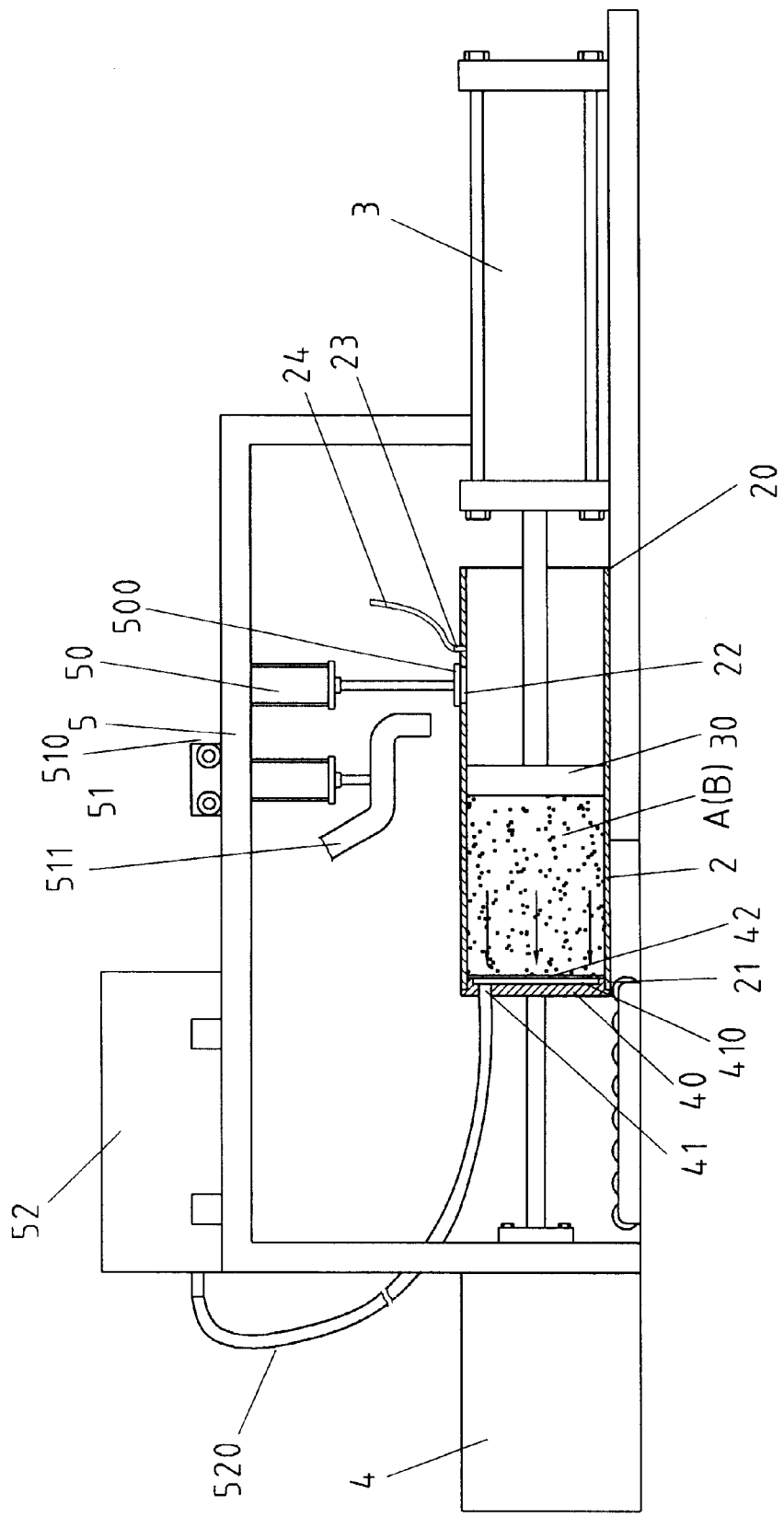
FIG. 4 is a schematic view of this invention showing compression and air evacuation.
Figure 5:
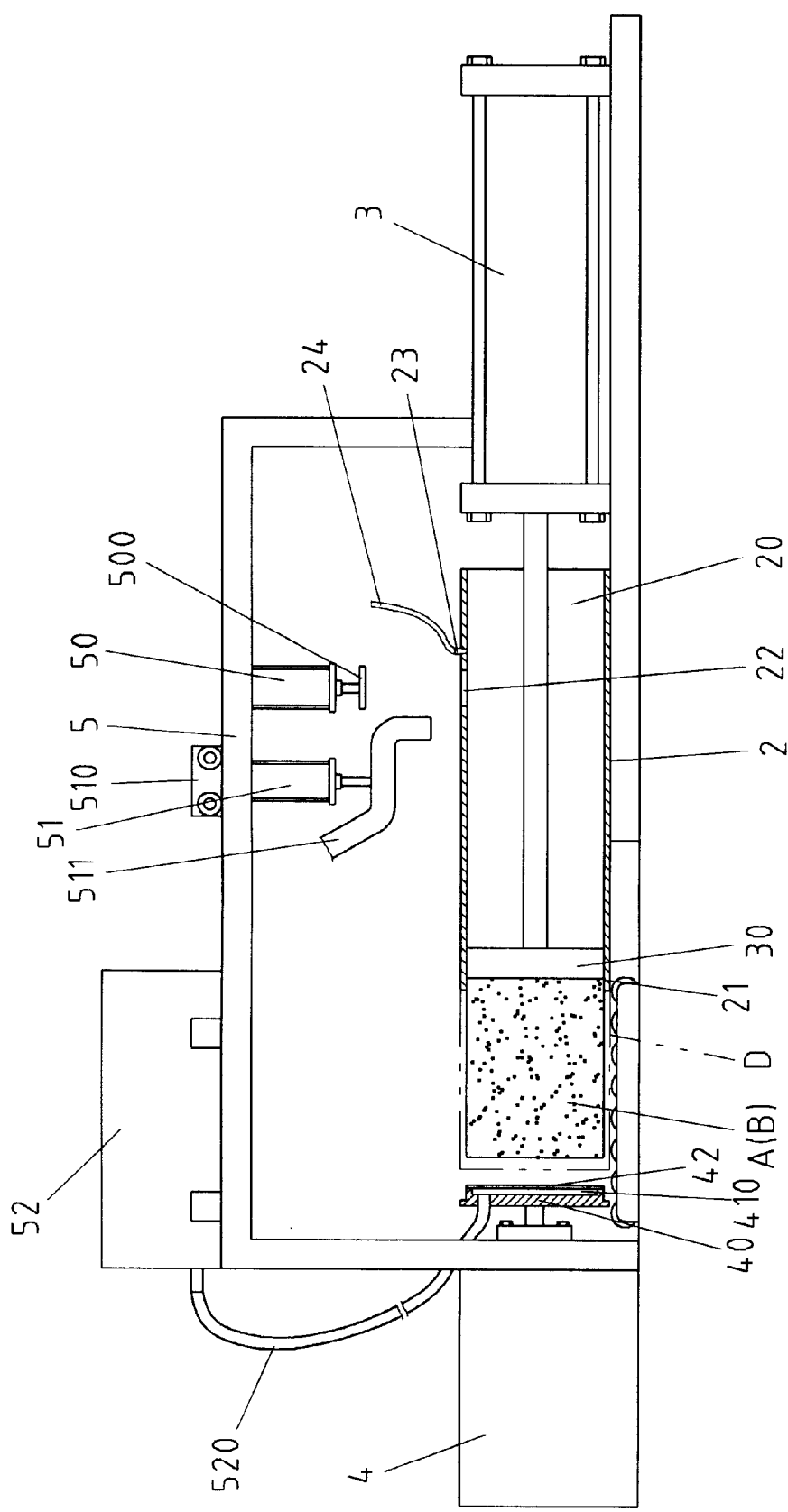
FIG. 5 is a schematic view of this invention showing solidifying and forming duration.

At this point of time, the compressible hydraulic cylinder 3 starts to act (as shown in FIG. 4) by moving the piston 30 towards the outlet 21 to compress the solidifying material A and the pending solidification material B to shrink their volume for the stabilizer C to readjust its internal stress. As shown in FIG. 5, before the solidifying material A and the pending solidification material B start to coagulate, the air evacuation is stopped, the sealing cover 40 is retreated back to the closed hydraulic cylinder 4, and the piston 30 of the compressible hydraulic cylinder 3 keeps moving forward to force and drain the compressed and saturated solidifying material A and the pending solidification material B out of the forming chamber 2.

Figure 6:
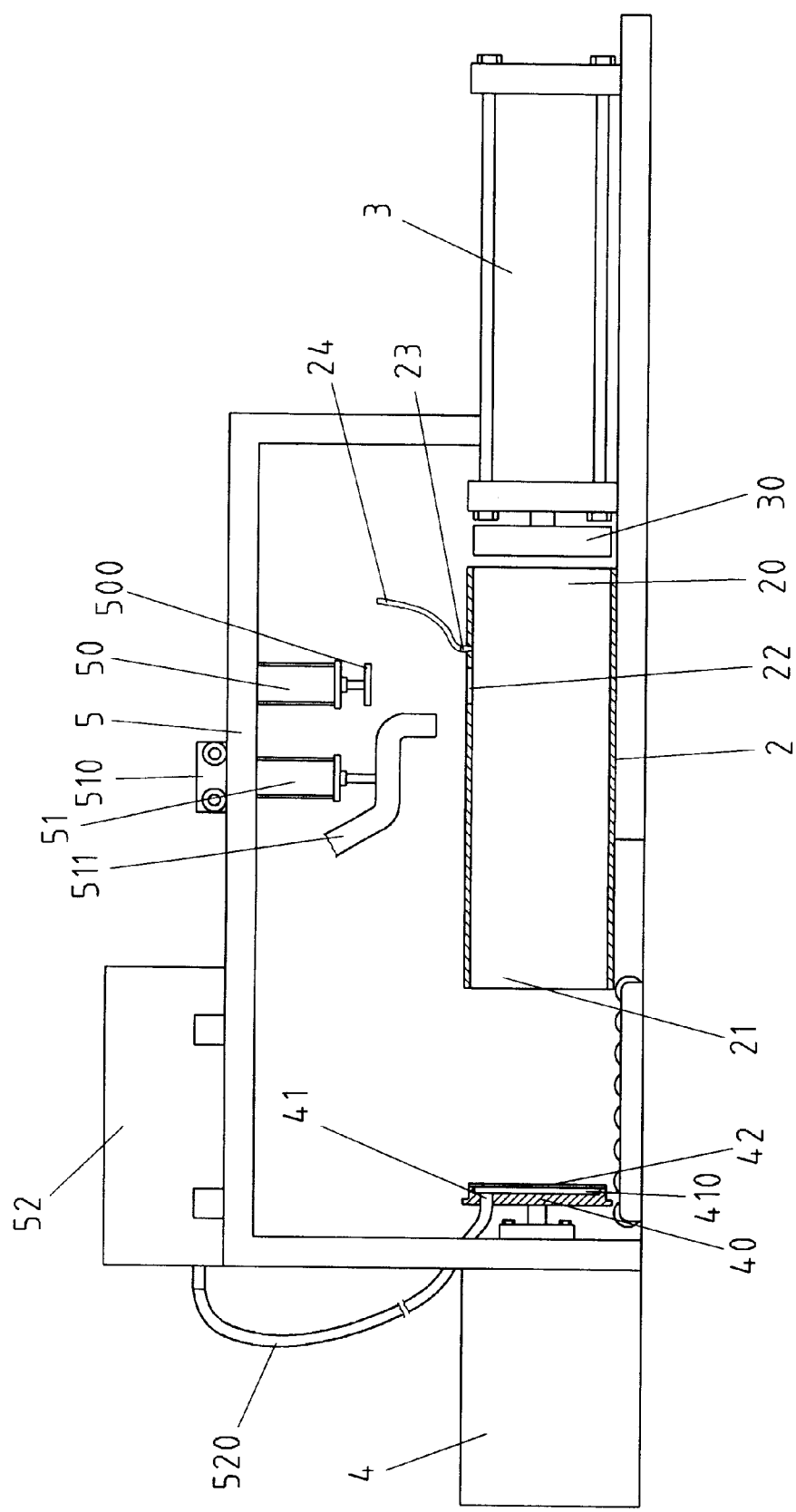
FIG. 6 is a schematic view showing a forming chamber of this invention under cleaning.

The micro-particles of the expelled material will be gathered by atmosphere pressure to form aggregated hard pieces and drop into a container D on a conveyer for transportation and storage. When cleaning the forming chamber 2 is desired after a long time operation, as shown in FIG. 6, the piston 30 of the compressible hydraulic cylinder 3 can be drawn back to leave the forming chamber 2.

From the abovesaid, the merits of this invention may be summarized in the following:

1. The principle of vacuum osmosis is applied instead of blade mixing to thorough moisten powder and dosed liquid in solidification process; and by evacuating air inside to lessen internal pressure, the solidified material becomes high-density aggregated hard pieces.
2. The defects in conventional blade agitation are eliminated. No remainder will accumulate in the forming chamber to ensure lifetime of continuous operation for mass production.
3. As the moisture content is rather low during solidification process, the strength of cement against pressure can be substantially kept.
4. The interior pressure produced by the compressible hydraulic cylinder enables the stabilizer to distribute and osmose uniformly, and it can minimize the solidified volume to enhance impermeability and ability of moisture-proof for easy storage and transportation.
5. The forming chamber is substantially opened at both ends that can facilitate a cleaning job.

Although, this invention has been described in terms of preferred embodiments, it is apparent that numerous variations and modifications may be made without departing from the true spirit and scope thereof, as set forth in the following claims.

What is claimed is:

1. A vacuum osmosis and solidification forming machine, comprising:

a forming chamber further comprising an inlet and an outlet disposed at two ends respectively, a deeding mouth, and a spray nozzle, wherein said spray nozzle is disposed next to an injection tube;

a compressible hydraulic cylinder disposed in front of the inlet of said forming chamber is provided with a piston at its front end;

a closed hydraulic cylinder disposed in front of the outlet of the forming chamber is provided with a sealing cover at its front end, wherein an evacuation orifice opens to a gas room which is equipped with a filter net on its front face is formed in said sealing cover; and a support frame enclosing said forming chamber having a stationary hydraulic cylinder which is equipped with a sealing board; a movable hydraulic cylinder disposed adjacent to said stationary hydraulic cylinder which, the movable hydraulic cylinder, is provided with a pulley set movable horizontally on said support frame and an input tube connected to its front end; and a vacuum pump disposed at a lateral end is offered a vacuum tube connected to the evacuation orifice in said sealing cover;

wherein the air is evacuated by said vacuum pump to empty said forming chamber, and by applying the principle of vacuum osmosis, the first solidifying material and the pending second solidification material are thoroughly moistened, in contacted with a stabilizer, and compressed to a minimum volume for achieving solidification purpose.

2. The vacuum osmosis and solidification forming machine of claim 1, wherein the filter net of said sealing cover is made of a metallic material and is covered with a nonwooven cloth piece.

* * * * *